No. 776,592. PATENTED DEC. 6, 1904.
H. H. HULL.
WIRING MACHINE.
APPLICATION FILED NOV. 8, 1902.
NO MODEL. 6 SHEETS—SHEET 1.

Fig. 1

Witnesses:
Chas. D. King
Arthur L. Helmes

Inventor:
Herbert H. Hull
By his Attorney

No. 776,592. PATENTED DEC. 6, 1904.
H. H. HULL.
WIRING MACHINE.
APPLICATION FILED NOV. 8, 1902.
NO MODEL. 6 SHEETS—SHEET 2.

Fig.2

Witnesses:
Chas. D. King
Arthur L. Holmes

Inventor:
Herbert H. Hull
By his Attorney

No. 776,592. PATENTED DEC. 6, 1904.
H. H. HULL.
WIRING MACHINE.
APPLICATION FILED NOV. 8, 1902.
NO MODEL. 6 SHEETS—SHEET 3.

Witnesses:
Chas. D. King
Arthur L. Helmes

Inventor:
Herbert H. Hull
By his Attorney

No. 776,592.

Patented December 6, 1904.

UNITED STATES PATENT OFFICE.

HERBERT H. HULL, OF CLEVELAND, OHIO, ASSIGNOR TO HULL KEY CAN COMPANY, OF CLEVELAND, OHIO, A CORPORATION OF NEW JERSEY.

WIRING-MACHINE.

SPECIFICATION forming part of Letters Patent No. 776,592, dated December 6, 1904.

Application filed November 8, 1902. Serial No. 130,520. (No model.)

*To all whom it may concern:*

Be it known that I, HERBERT H. HULL, a citizen of the United States of America, and a resident of Cleveland, county of Cuyahoga, and State of Ohio, have invented certain new and useful Improvements in Wiring-Machines, of which the following is a specification.

My invention relates generally to wiring-machines, and has more particularly reference to a machine for introducing a wire inside of the covers of a packing vessel, such as is shown and described in Letters Patent No. 636,339, granted to me on the 7th of November, 1899, and is, furthermore, an improvement upon Patents Nos. 588,749 and 634,112, heretofore granted to me.

I shall describe a wiring-machine embodying my invention and afterward point out the novel features in the claims.

The cover or other article to be wired is usually in the form of a disk-shaped blank having a dependent surrounding edge or brim, inside of which latter the wire is introduced and attached by curling the said brim over it. In order, however, to afford a means whereby the cover can be ripped off and removed from the body of the can to which it has been soldered, an excess of wire has to be provided, so that one end of same will project outside of the said cover.

The main object of my invention is to produce a machine which will automatically provide the blanks with a wire in the most efficient and inexpensive manner. In carrying out this object my invention comprises a plurality of dies (in this instance four) adapted to act successively upon a blank to accomplish the desired result and supplementary devices, notably a special construction of wire-feed mechanism and a peculiar conveyer for shifting the blanks from one die to another and for progressing them through the machine. The first die is provided with a mechanism for partially curling the brim or dependent surrounding edge, so as to subsequently facilitate the complete curling of the said brim over the wire, and comprises an outer stationary ring or member having an annular ledge, a vertically-movable member adapted to hold the upper portion of the dependent edge of the cover rigid against the inside of the stationary ring, and an inner expansible ring having an annular flange for pinching the lower portion of the brim of the cover and for allowing the lowermost portion of same to be partially curled by the annular ledge of the stationary member. The second die is provided with an outer stationary member or ring and an inner horizontally-movable member. Adjacent to the said die are located two parallel rock-shafts operated in unison, one of which carries a cutting device and the other of which has means for moving the movable member of the die against the stationary member of same in the direction of the cutting device, so as to pinch the blank or cover while the cutter is acting upon it. The third die is adapted to receive an excess of wire and to have part of said wire pulled out again and cut off from the continuous strand of wire before the blank or cover comes into position on the said die and to curl the brim of the said blank over the wire. To this end it comprises an intermediate member or ring having a circumferential depression, an outer vertically-movable member having an inside peripheral surface and a circumferential ledge, the latter being substantially coincident with but not projecting over the circumferential depression of the stationary member, and an inner expansible member. The fourth die is merely a mechanism for bending the excess of wire which projects outside of the brim of the blank up against the outside of the brim of the said blank.

The wire-feed mechanism comprises two rolls adapted to receive an intermittent progressive motion to feed the wire and consists, further, of a retractor mechanism independent of the two rolls for pulling part of the wire fed into the third die out again in order to tighten the said wire around an inner expansible member or ring, so as to move it into the circumferential depression of the intermediate member. In connection with the wire-feed mechanism is also a safety-stop operated by the second die, by means of which no wire will be fed when by any accident there is no blank to receive it, thereby preventing the mechanism from becoming tangled up by the wire.

The conveyer comprises, broadly, two parallel rock-shafts carrying members for progressing the covers through the machine by having a lengthwise or longitudinal movement imparted to them, the said members, however, rocking with the rock-shafts toward and away from each other, so as to seize and release the covers at the proper moment. The arrangement of the parts is such that the members are moved toward each other to seize the covers and then longitudinally in one direction, then out again or away from each other, and then back while in their outermost position longitudinally in the opposite direction.

My invention further comprises the combination and arrangement of parts and other features of construction, as will more fully hereinafter appear.

The blanks are fed to a continuously-revolving dial, which brings them into alinement with the conveyer and into the path of progression of the machine. Here they are taken singly and passed to the first die, which starts the inward curling of the lower edge of the brim just slightly to facilitate the subsequent complete inward curling of the brim over the wire. The blank is then progressed to the second die, which cuts two openings in the brim to allow the introduction of the wire in the proper manner and to allow the excess of wire to project out through one of the said openings. Incidentally a key impression is stamped in the upper surface of the blank. The blank now advances to the third or wiring die, into which the wire is introduced, an excess of wire being fed so as to allow the said wire to be tightened around and under the inner member or expansible ring into the circumferential depression of the intermediate member and so as to allow a portion of the same to project out through one of the openings aforesaid. If there is no blank in the second die, the safety-stop will prevent the introduction of wire into the third die. The blank is then carried to the fourth die to bend the excess of wire up against the outside of the brim. The further progress of the blank moves it out of the machine.

In the accompanying drawings I have embodied my invention in a suitable form. The construction and arrangements of the parts, however, so far as the broad claims are concerned, can be widely varied, although the special structure shown involves in itself new and valuable features of construction.

Fig. 4 is an enlarged front view of the dies and adjacent elements. Figs. $4^a$ and $4^b$ are detailed views of part of the operating means for the conveyer and a stop operated by the latter. Fig. 5 is a sectional view similar to but on a slightly larger scale than Fig. 4, showing the construction of the dies. Fig. $5^a$ is an enlarged detailed view of the wiring-die, showing the expansible member in its expanded position and showing a wire in the die. Fig. 6 is a sectional view of the blank in the form in which it is fed to the machine. Fig. 7 is a view similar to Fig. 6, showing the form of the blank after it has been acted upon by the first die. Fig. 8 is a view similar to Figs. 6 and 7, showing the effect of the second die. Fig. 9 is a view similar to Figs. 6, 7, and 8; and Fig. 10 is a top view of the blank, the said Figs. 9 and 10 illustrating the blank as it appears after having passed through the third die and also showing the key impression made by the second die. Fig. 11 is a view similar to Fig. 10, showing how the excess of wire is bent up against the brim by the fourth die. Fig. 15 is a side view, on a large scale, of the wire-feed mechanism.

Similar letters of reference indicate corresponding parts in the different views.

A denotes a framework of any suitable construction, supporting the various parts and mechanisms of the machine. In front are mounted the four dies B, C, D, and E, all located in alinement with each other and central of the path of progression of the blank through the machine. In proper relation to these are mounted in the head A' the four punches B', C', D', and E'.

F is the main shaft, carrying the pulleys $f'$ and $f^2$, from which motion is derived, and the pinion $f^3$, meshing with the spur-gear $g'$ of the cam-shaft G, mounted in suitable bearings in the rear of the machine.

The construction of the punches B', C', D', and E' need not be described in detail, as all the operating mechanisms peculiar to my invention are located in the dies. Suffice it to say that they are operated in the guide $A^2$ of the head A' and are actuated by the eccentric-straps $g^2$ and $g^3$ of the cam-shaft G through the levers $a'$, $a^2$, and $a^3$ in a well-known manner, one set of levers being provided on each side of the machine.

H is a continuously-revolving blank-feeding dial, and I the wire-feed mechanism.

J is a conveyer for the blanks.

M is a reel of wire for the wire-feed mechanism.

The dial H revolves continually, it being driven from the pulley $g^4$ by means of the belt $h'$ passing over the idlers $h^2$ and $h^3$ to the pulley $h^4$, mounted on the shaft $h^5$, carrying the dial H. The said dial is further provided with a stationary feed-table $h^6$, from which the blanks are fed, and with a stationary side wall $h^7$ and center guide $h^8$, which narrows down the space in which the blanks travel adjacent to the point where the dies are located, so that one blank is fed in at a time.

The conveyer J is composed of two parallel rock-shafts $j'$ and $j^2$, which carry two series of opposed gripping portions $j^3$ and $j^4$, located in the same horizontal plane, each series having in this instance five members, located in the same horizontal plane. These gripping portions are formed so as to properly grip the blank and preferably in the shape of a V, as shown, and are usually provided with supporting-ledges, as $j^5$. These gripping portions are not mounted directly on the rock-shafts $j'$ and $j^2$, but are pivoted on the sleeves $j^6$, which are mounted fast on the rock-shafts by means of feathered keys $j^7$ in a well-known manner, so as to be capable of longitudinal reciprocating movement, which is imparted to both in unison by means of the cam $G'$, lever $j^8$, connection $j^9$, and cross-piece $j^{10}$, engaging with the flanges $j^{11}$ of the grooves $j^{12}$, one on each sleeve $j^6$. The spring $j^{13}$ is for the purpose of facilitating the return movement of the said sleeve $j^6$. The sleeves $j^6$, with gripping portions $j^3$ and $j^4$, also partake of the rocking motion by reason of the feathered keys $j^7$, which is imparted to the rock-shafts $j'$ and $j^2$ by means of the cam $G^2$ and spring $j^{15}$, the said spring normally holding the opposed gripping portions in contact with the blank, while the cam rocks the shafts outward by means of the lever $j^{14}$, bell-crank $j^{16}$, connecting-rod $j^{17}$, and crank $j^{18}$, which rock both shafts simultaneously, moving the gripping portions toward and away from each other. The spring $j^{19}$ helps to push the opposed gripping portions away from each other. The parts are so arranged and timed that the gripping portions $j^3$ and $j^4$ are moved toward each other to grip the blank, then in a longitudinal direction to shift the blank held between each opposed pair of gripping portions from one die to another, then they are rocked away from each other, leaving the blank on the said die, and finally return in a longitudinal direction, after which they are moved toward each other to seize the next blank. Five pairs of opposed gripping portions are shown—that is, one more pair than the number of dies.

$k$ and $k'$ are two stops to prevent the dial from feeding the blanks too fast or irregularly to the conveyer, both mounted on the spindle K. The stop $k$ is normally held down by means of the spring $k^2$ and is lifted up by the strip of bent metal $k^3$, carried by the conveyer. The stop $k'$ is held down by its own weight normally and is provided with an arm $k^4$, with which engages the arm $j^{20}$ of the conveyer J to lift the said stop up when the opposed gripping portions move toward each other.

Each die is provided with a knock-out pad, respectively $b'$, $c'$, $d'$, and $e'$, which serves to receive the blank from the conveyer and to support it until the punch moves the blank down into the die and also to knock it out of the die again and to lift it up into a position where the conveyer can seize it. Each of these pads is normally held up above the die by the spring $l'$, controlling the arm $l^2$, mounted loosely upon the shaft L, having the bifurcated arms $l^3$, each bifurcated arm engaging with a pin $l^4$ on either side of the stems $b^2$, $c^2$, $d^2$, and $e^2$ of the knock-out pad. Each bifurcated arm $l^3$ is provided with a pin $l^5$, adapted to be moved down by the projection $l^6$, fast on the shaft L, which shaft is operated by the cam $G^3$ and roll $g^8$, mounted on the shaft $g^9$ and connecting with the said shaft L by the arms $g^{10}$, $g^{11}$, and $g^{12}$. The purpose of this is to depress the pads when the conveyer moves the blanks from one die to another. When the punches descend upon the dies, the pads are of course depressed by the said punches, and to facilitate the return movement to knock or lift the blank out of the die a piece of soft compressible rubber, as $l^7$, is used on the second and third die. On the first and fourth die the spring $l'$ is sufficient to obtain the proper result. The two pieces of rubber $l^7$ are suitably mounted, as on the bracket $l^8$, carried by the rod $l^9$, attached to the framework.

The die B is provided with an outer stationary ring or member $b^3$, having an annular ledge $b^{11}$, and an inner ring $b^4$, having an annular flange $b^{16}$, which ring $b^4$ is split into four parts in a well-known manner and adapted to be expanded by the member $b^5$, operated by the bifurcated arm $l^{10}$ engaging with the pins $l^{11}$, carried by the shaft L', which latter is operated from the cam $G^4$ through suitable connections, as the roll $g^{13}$, mounted on the shaft $g^9$, arm $g^{14}$, connecting-rod $g^{15}$, and lever $g^{16}$. In this instance the pad $b'$ is made to serve in conjunction with the split ring $b^4$ to pinch the blank against the inner wall of the outer ring $b^3$, so that only the extreme lower edge of the blank will be inwardly curled. Thus the annular flange makes the split ring of the same diameter as the pad when it is expanded, which is equal to the inside diameter of the ring $b^3$. The curling takes place at the point $b^{10}$, where there is located the annular ledge $b^{11}$, over which the flange $b^{16}$ of the split ring $b^3$ projects. If the blank is not held tightly except at the point where it is to be curled, the effect would be a long sloping curve instead of a short slight curve at the lowermost edge of the brim of the blank.

The die C is composed of an outer ring $c^3$ and an inner movable ring $c^4$ below the pad $c'$, provided with a projection $c^{15}$, which extends up through the aperture $c^{16}$ in the pad $c'$. $c^5$ and $c^6$ are two rock-shafts located parallel to each other and connected at one end by the arms $c^7$ and $c^8$ and the link $c^9$. $c^5$ carries a projection $c^{10}$, which extends into the inner ring $c^4$, while $c^6$ carries two cutters $c^{14}$ for cutting the two openings in the blank previously referred to. The rock-shafts are held in their normal position by the spring $c^{11}$, but are rocked toward each other by the plunger $c^{12}$, carried by the punch $C'$ and moving with the same, descending upon the contacting surface $c^{13}$. The effect of this is to cause the inner ring $c^4$ to move in the direction of the cutters $c^{14}$, so that the projection $c^{15}$ will pinch the blank against the outer ring and also to impart a rocking motion to the cutters, so as to operate the same, thereby cutting the two openings in the brim of the blank.

The die D has an outer vertically-movable ring $d^3$, having an inside peripheral surface or incision $d^{25}$ and a circumferential ledge $d^{26}$ held normally in position by the pins $d^4$, having each a spring $d^5$. The pins $d^4$ rest upon the member $d^6$, which is operated from the shaft $L^3$ by means of the bifurcated arm $l^{12}$ engaging with the pins $l^{13}$ on the said member $d^6$. The shaft $L^3$ is operated from the cam $G^5$ by means of the roll $g^{18}$, mounted on the shaft $g^9$, arm $g^{19}$, connecting-rod $g^{20}$, and lever $g^{21}$. The die D is further provided with an intermediate stationary ring $d^7$, having a circumferential depression $d^{27}$, and with an inner expansible split ring $d^8$, having an annular flange $d^{28}$ and a circumferential groove $d^{60}$ on the lower side of the flange, which split ring is expanded by the member $d^9$, operated from the shaft $L'$ by the bifurcated arm $l^{14}$ engaging with the pins $l^{15}$ in a manner similar to the ring $b^4$ of the die B. Adjacent to the die D is a movable plate $d^{10}$, traveling in the curved slot $d^{11}$ by means of the pin $d^{12}$ and operated by the bell-crank $d^{13}$, attached to the framework and receiving its motion from the cam $G^6$ by means of the rod $g^{22}$, attached to the rock-shaft $L'$ of the wire-feed mechanism, the said shaft $L'$ receiving its motion from the said cam $G^6$ by means of the rods $g^{23}$ and $g^{24}$. The plate $d^{10}$ carries two fingers $d^{15}$ and $d^{16}$, and carries, further, a knife or cutter $d^{17}$ for cutting off the wire. The wire is fed through the guides $i^{50}$ and $d^{50}$, through the cutter $d^{17}$, over a groove in the finger $d^{15}$, and in through the opening $d^{51}$ of the die. The finger $d^{15}$ extends into the die through the opening $d^{52}$.

The die E is provided with a stationary inner ring $e^3$ and a stationary outer ring $e^4$ and has pivoted adjacent to it on the arm $e^5$ a movable portion $e^6$, carrying the piece $e^7$, which bends the excess of wire up against the blank. The portion $e^6$ is operated through the arm $e^{25}$ by the cam $G^7$. As will be noticed, the piece $e^7$ extends into a cut-out $e^8$ of the die and has an arc-shaped surface $e^9$, which comes in contact with the excess of wire.

Figure 12:
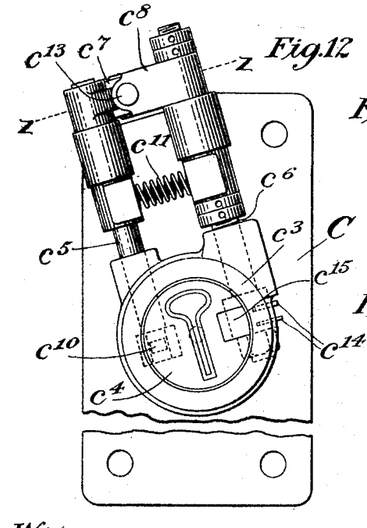
Fig. 12 is a plan view of the second die with the knock-out pad removed. Fig. $12^a$ is a section on line $zz$ of Fig. 12.
Figures 12A, 13A, 15:
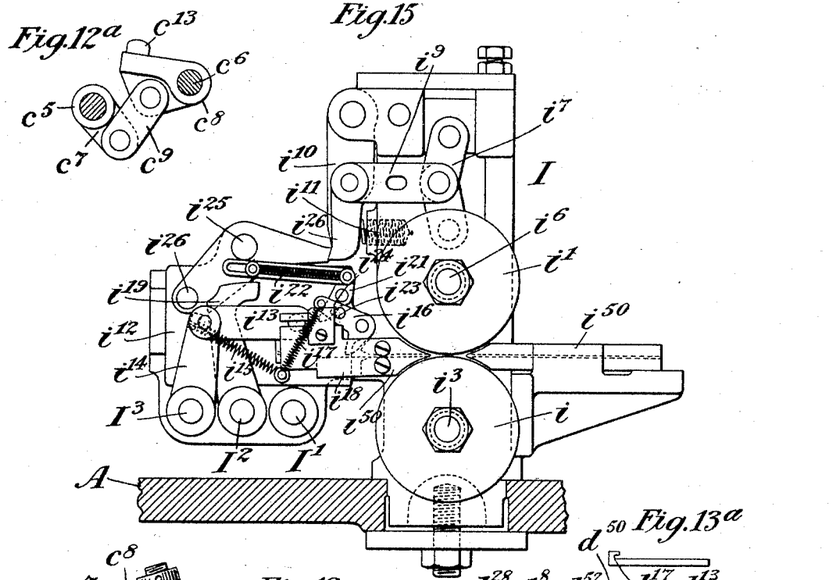
Figure 13:
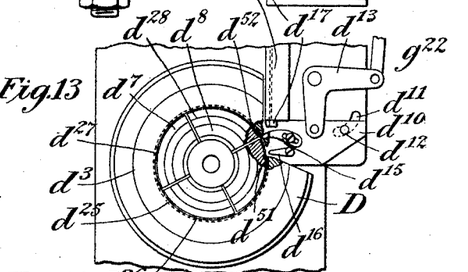
Fig. 13 is a plan view of the third or wiring die with the knock-out pad removed. Fig. $13^a$ is a detailed view of the cutter of the wiring-die.
Figure 14:
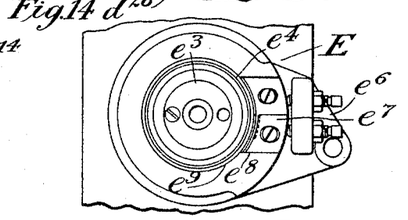
Fig. 14 is a plan view of the fourth die with the knock-out pad removed.

The wire-feed mechanism I comprises two rolls $i$ and $i'$, the lower of which is mounted in stationary bearings and is operated from the eccentric $g^{26}$, rack $g^{27}$, gear $g^{28}$, having the pawl $g^{29}$ moving the same. The pawl $g^{29}$ engages with the ratchet $i^2$, mounted on the shaft $i^3$, carrying the roll $i$. The shaft $i^3$ carries a gear $i^4$, meshing with a similar gear $i^5$ on the shaft $i^6$ of the roll $i'$. Owing to the pawl-and-ratchet mechanism, the rolls will have imparted to them an intermittent motion in one direction only, so as to feed the wire, but will not rotate backward. The upper roll $i'$ is mounted on the toggle-joint $i^7$, controlled by the rigid connection $i^9$ of the pivoted arm $i^{10}$. The upper roll is normally held out of contact with the lower roll by the spring $i^{11}$ pressing against the pivoted arm $i^{10}$. $i^{12}$ is a slider controlled by the links $i^{13}$ and $i^{14}$, carried by the rock-shaft $I^3$, mounted in stationary bearings and operated from the cam $G^8$ through the crank $i^{15}$ and arms $g^{30}$ and $g^{31}$. The slider $i^{12}$ carries a dog $i^{25}$, pivoted at its center and normally having engagement with the projection $i^{26}$ of the arm $i^{10}$ by the spring $i^{15}$. A forward movement of the slider $i^{12}$ will cause the toggle $i^7$ to be straightened out and the upper roll $i'$ to descend into contact with the lower roll and upon the rotation of the rolls to feed the wire between them. The slider $i^{12}$ further carries a retractor-dog $i^{16}$, which by the action of the spring $i^{17}$ will normally grip the wire between itself and the piece of steel $i^{18}$ and pull back a certain amount of wire upon the return stroke of the slider independently of the feeding-rolls.

The wire-feed mechanism further carries the shaft $I^2$, provided with the safety-dog $i^{19}$, which when rocked backward engages with the pin $i^{20}$ of the dog $i^{25}$ and moves the latter out of engagement with the projection $i^{26}$, so that the roll $i'$ will not descend upon the roll $i$ when the slider $i^{12}$ moves forward, thus preventing any wire from being fed. The movement of the dog $i^{25}$ whereby it is disengaged from the projection $i^{26}$ also moves the retractor-dog $i^{16}$ out of operative position through the instrumentality of the pivoted member $i^{21}$, connected with the dog $i^{25}$ by the spring $i^{22}$ and engaging with the projection $i^{23}$ of the retractor-dog $i^{16}$ by means of the ledge $i^{24}$. Thus when the dog $i^{25}$ is disengaged from the projection $i^{26}$ and no wire is fed the retractor-dog $i^{16}$ is lifted out of its operative position and no wire is pulled back.

The shaft $I^2$ is controlled by the safety-stop O, which comprises a pivoted lever $o'$, located adjacent to the die C on the framework and provided with a member $o^2$, adapted to project into the said die if there is no blank in the said die. The lever $o'$ is connected with the shaft $I^2$ by means of the rod $o^3$ and crank $o^4$. The shaft $I^2$ carries a second crank $o^5$, connected with the rod $o^6$, having the nut $o^7$ at its outer end. The rod $o^6$ carries a loose sleeve $o^8$, between which and the nut $o^7$ is a compressible spring $o^9$, adapted to slide on the said rod by means of the arm $o^{10}$, having a friction-roll $o^{11}$ engaging with the cam $G^9$. The rotation of the said cam $G^9$ has the effect of sliding the sleeve $o^8$ upon the rod $o^6$, thereby pressing the spring $o^9$ against the nut $o^7$, so as to cause the rod $o^6$ to rock the shaft $I^2$. If there is a blank in the die C, however, the entrance of the member $o^2$ into the die is arrested by the said blank, thereby preventing the rod $o^6$ from rocking the shaft $I^2$, and the movement of the cam $G^9$ will then have the effect of merely compressing the spring $o^9$ without operating the shaft $I^2$ and the safety-dog $i^{19}$, mounted on the same. If there is no blank in the die C, the member $o^2$ is free to enter the same, and the shaft $I^2$ will be rocked by the cam $G^9$, thus preventing the wire from being fed to the die D and also preventing the pull back of the wire. If this safety-stop were not provided, the wire would be fed to the die D at all times, and the absence of a blank in the preceding die to utilize the said wire would result in getting the mechanism tangled up by the unused wire. Several details of construction in the various parts of the machine have been omitted, as they are well known in the art and need not be described elaborately.

Figure 1:
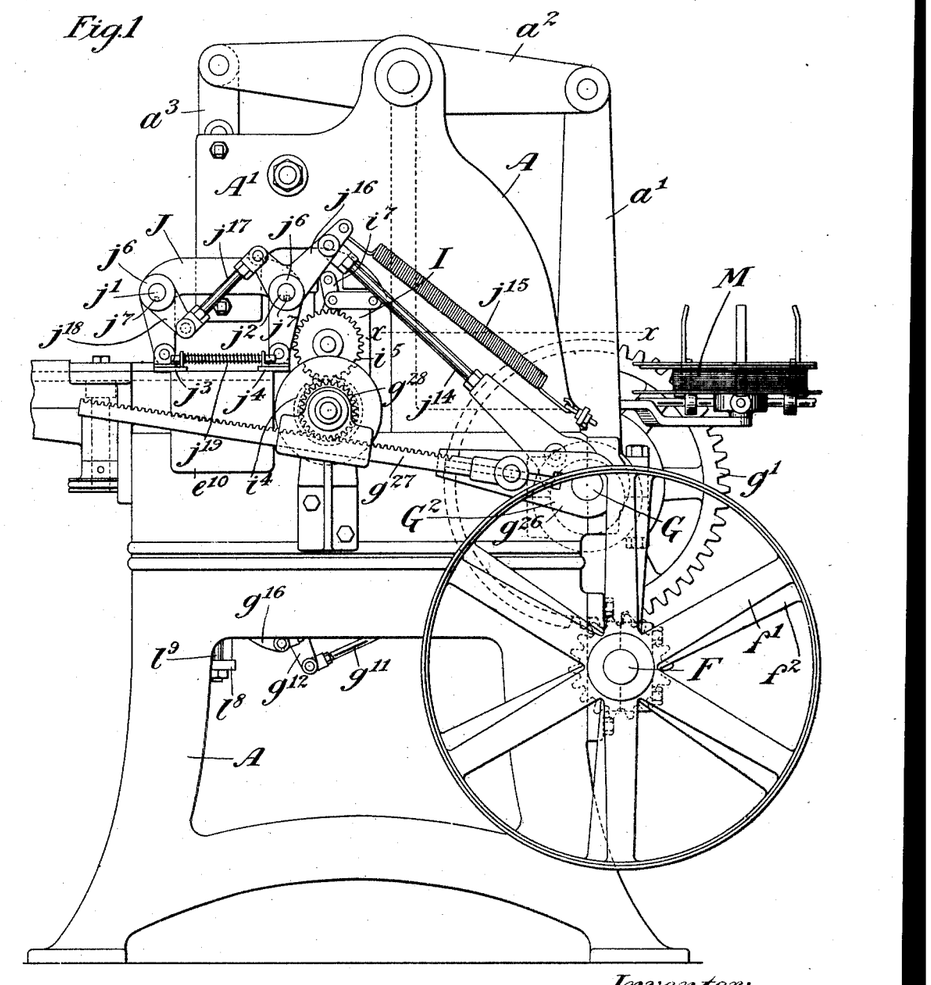
Figure 1 is a side view of a machine embodying my invention.
Figure 2:
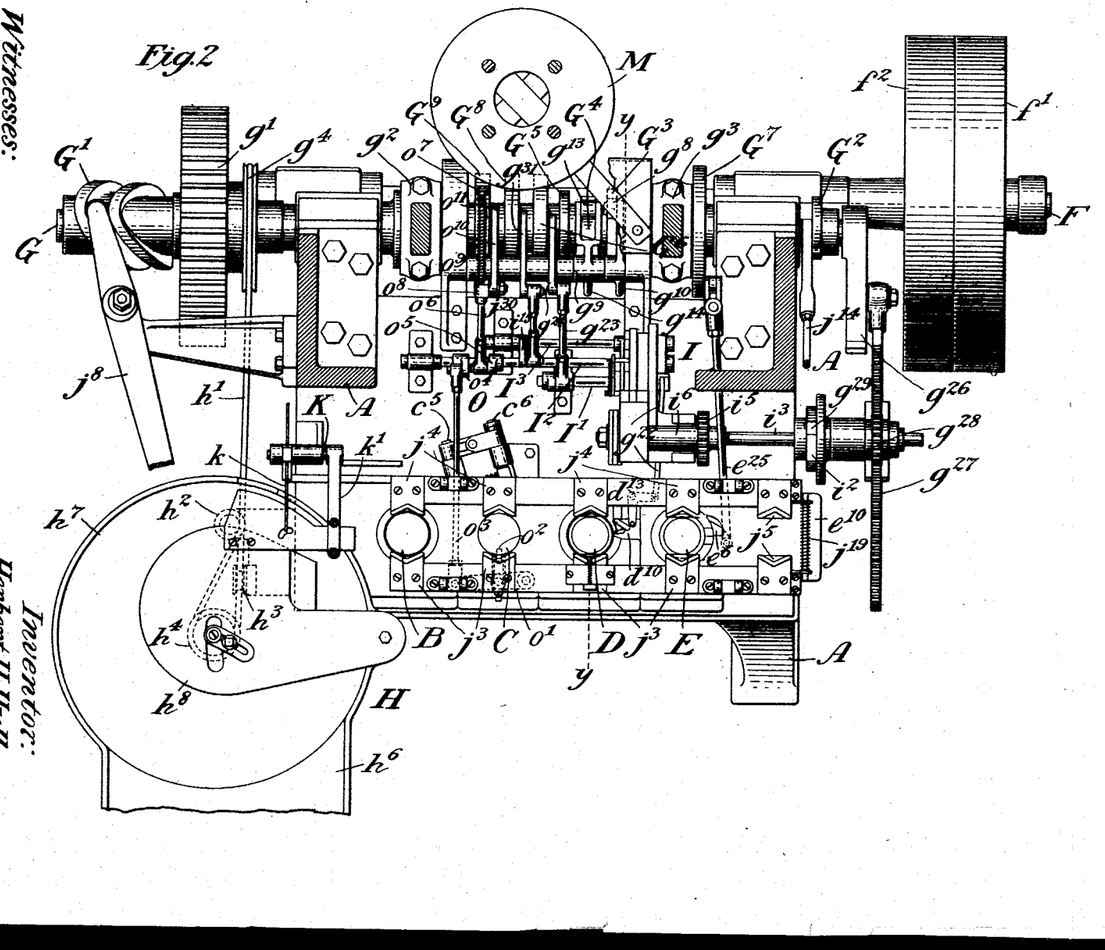
Fig. 2 is a plan view with a section through the framework on the line $xx$ of Fig. 1.
Figure 3:
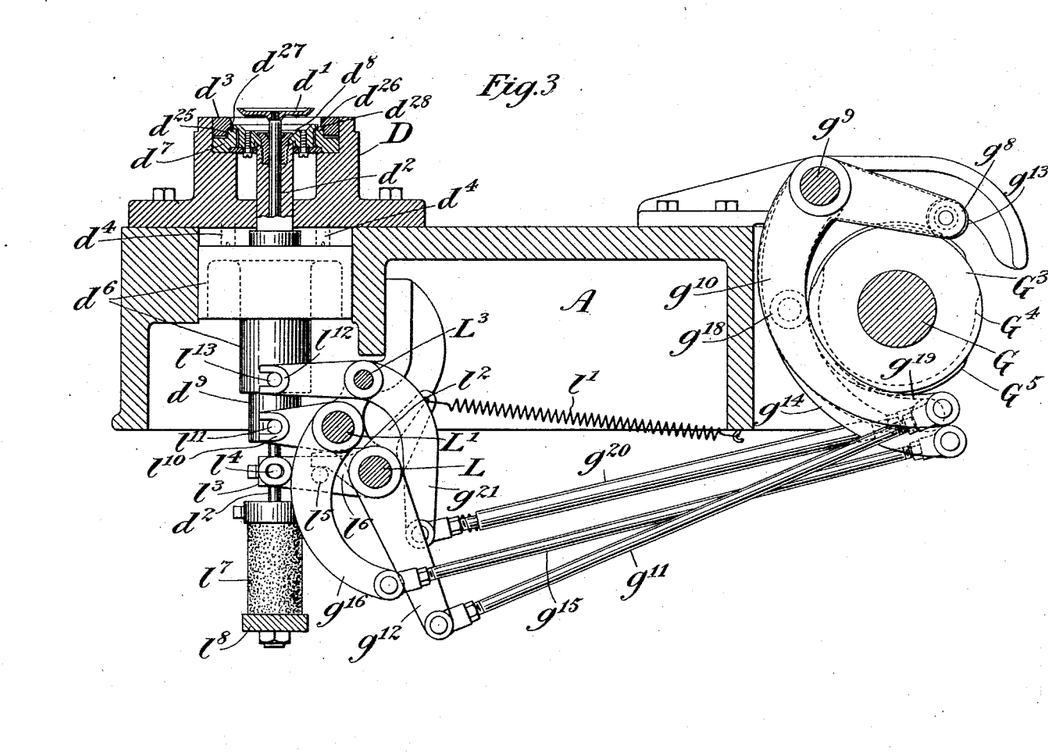
Fig. 3 is a sectional view of Fig. 2 on the irregular line $yy$, showing the connections from the cam-shaft to the dies.
Figures 4, 4A, 4B:
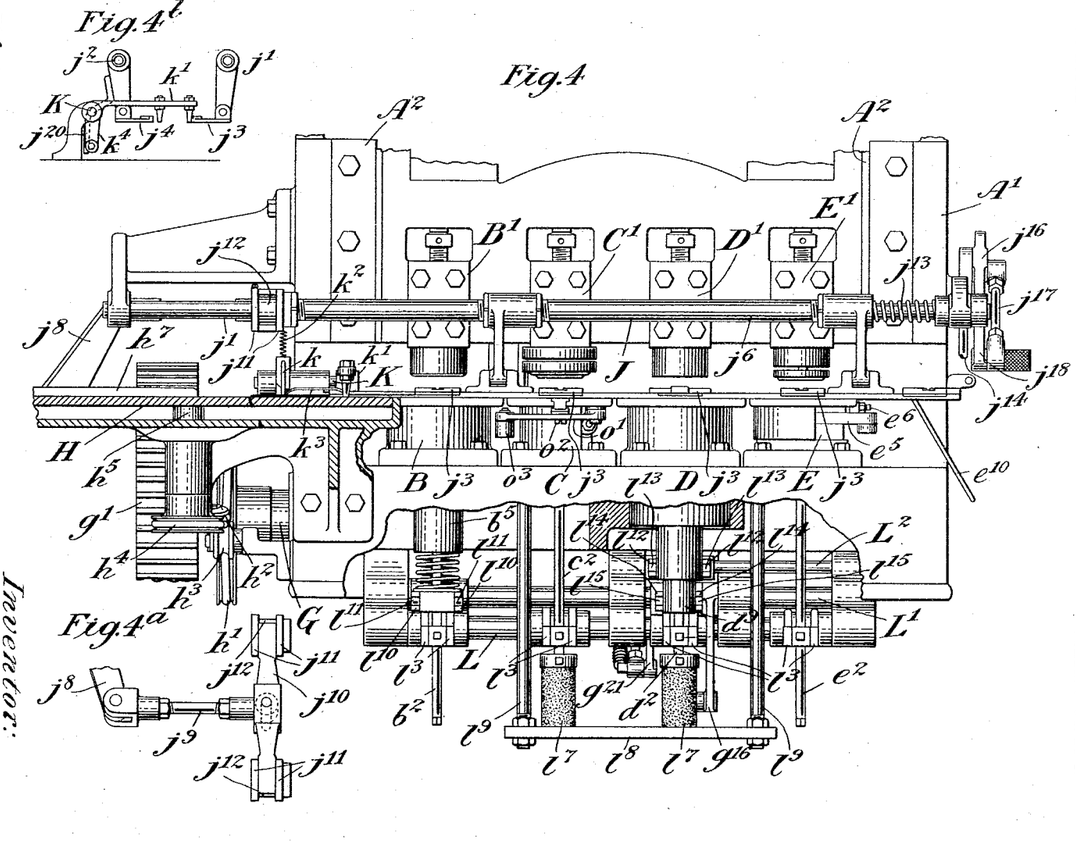
Figures 5, 5A, 6, 7, 8, 9, 10, 11:
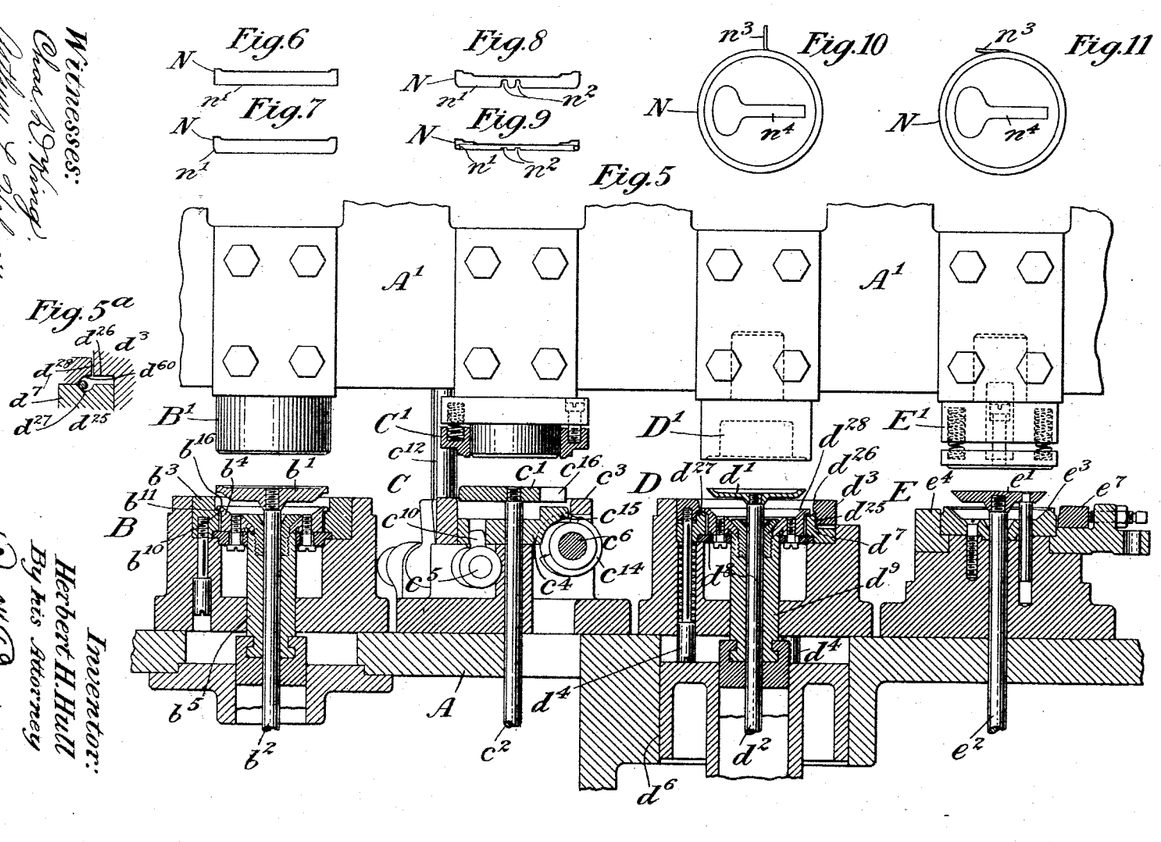

The operation of the machine is as follows: The blanks N are fed on the dial H, which revolves continuously and delivers them up to the conveyer J. Before reaching the said conveyer, however, the blanks are detained singly by the action of the stops $k$ and $k'$. If the conveyer J is now on the back stroke in a longitudinal direction, the strip of metal $k^3$ lifts the stop $k$ up, and as the opposed gripping portions $j^3$ and $j^4$ of the conveyer move toward each other or toward the center of the path of progression of the blank and clasp the blank the arm $j^{20}$ of the said conveyer engages with the arm $k^4$ and moves the stop $k'$ up so that the first pair of opposed gripping portions are allowed to move the blank by its longitudinal forward stroke over on the first die B. As the conveyer J moves forward longitudinally the stops $k$ and $k'$ drop down again and prevent the blanks on the dial from being fed into the path of progression until the said conveyer returns. As the conveyer moves forward longitudinally the pad B' is depressed by the cam $G^3$, as previously explained, out of the way of the blank, but rises again as the conveyer comes to the end of its stroke to receive the blank. The opposed gripping portions $j^3$ and $j^4$ now move away from each other or away from the center of the path of progression, leaving the blank upon the pad $b'$. At this moment the punch B' descends and the inner split ring $b^4$ is expanded by the cam $G^4$, thereby holding the blank rigid by means of the said split ring and the pad, except at the bottom, whereby the lower edge of the brim $n'$ of the blank is inwardly curled just slightly, as shown in Fig. 6 and Fig. 7, by the circumferential ledge $b^{11}$. By the action of the spring $b'$ the pad moves out again, carrying the blank with it. In the meantime the conveyer J has moved the length of its return longitudinal stroke, and the opposed gripping portions $j^3$ and $j^4$ now move toward each other again and the second pair of these said opposed gripping portions clasps the blank and carries it to the dies C, the pads $b'$ and $c'$, as well as the other pads, being depressed by the cam $G^3$ while another blank is taken from the dial and brought into position on the die B. The pad $c'$ rises again and the punch C' descends and with it the plunger $c^{12}$, the punch C' moving the blank down on the die and the plunger $c^{12}$ contacting with the contacting surface $c^{13}$, thereby moving the inner ring $c^{14}$ against the blank and pinching the same by means of the projection $c^{15}$ against the outer ring $c^3$, and thereby also operating the cutters $c^{14}$, cutting the two openings $n^2$ in the blank, as shown in Fig. 8. Incidentally the key impression $n^4$ is also made in the blank in this die. The blank is then conveyed to the die D by the next pair of opposed gripping portions in the same manner as previously described, the pads being again depressed at this moment, as previously described. Before the said blank reaches the die D the outer ring $d^3$ is moved up by the cam $G^5$ in the manner described, thereby bringing into operating position the inside surface $d^{25}$ of the said ring, against which the wire-feed mechanism I feeds an excess of wire. The split ring $d^8$ now moves into its expanded position, so that the flange $d^{28}$ projects over the circumferential depression $d^{27}$ by the cam $G^4$, whereupon a very slight movement of the plate $d^{10}$ takes place, so that the free end of the wire will be pinched by the finger $d^{15}$ in the groove $d^{60}$ and depression $d^{27}$ and so as also to move the other end away from the inner surface $d^{25}$ by the finger $d^{16}$. At this moment the pull-back device of the wire mechanism is operated and the wire is tightened against the inner split ring $d^8$ in the groove $d^{60}$ and into the depression $d^{27}$, the outer ring $d^3$ moving down as the surface $d^{25}$ is no longer needed. The cam $G^6$ now moves the plate $d^{10}$ outward, thus cutting the wire by means of the cutter $d^{17}$ and also bending outward the free end of the wire against the edge of the die. The blank now comes in position on the die outside of the wire, the free end or excess of which projects out through one of the openings $n^2$. The plunger D' now descends, forcing the cover down in the die and the lower edge of the brim into the circumferential depression $d^{27}$ of the intermediate ring $d^7$, which is now closed by the flange $d^{28}$, thereby inwardly curling the said brim $n'$ completely over the wire. (See Figs. 9 and 10.) It will be understood that the succession of movements is so rapid that all this is practically accomplished simultaneously. The wire is fed against the outer member $d^3$ instead of into the depression $d^{27}$, as it is more easy to do so and to prevent the buckling and bending of the wire. If there is no blank in the preceding die C, the safety-stop O will act in the manner described and will prevent any wire from being fed to the die D. The blank is then moved to the last die E, where as the punch E' descends the piece $e^7$, operated by the cam $G^7$, bends the excess of wire or the projecting strand of wire $n^3$ up against the outside of the brim $n'$ of the blank, as shown in Fig. 11. The further advance of the blank brings it upon the chute $e^{10}$, whereby it is moved out of the machine and disposed of in some suitable way. The dies operate simultaneously, and there is of course always a blank in each die unless by inadvertence the blanks are not fed properly. The blanks are struck up on another press and are fed to the machine in the form shown in Fig. 6—that is, provided with a brim $n'$. This is done merely for convenience sake, as another die could of course be had whereby a flat blank could be acted upon. The openings $n^2$ are cut in the cover in the die immediately preceding the wiring-die, as great care must be taken to convey the said cover in the same relative position, so that the excess of wire will come in alinement with one of said openings $n^2$.

In the present instance a round cover or blank is shown; but any shape of cover could be operated upon. The words "ring," "circumferential," &c., used in the claims should be construed accordingly.

Instead of having the outer member $d^3$ of the wiring-die movable it could be made stationary and provided with a groove against which the wire could be fed. The cutting mechanism and means for operating the inner movable member of the die C could be operated by cams and slides or by other means in place of the rock-shafts.

Having thus described my invention, what I claim is—

1. In a machine of the character set forth, a plurality of dies for successively acting upon a cover having a dependent surrounding edge to provide the said cover with a wire inside of the said edge, means for operating said dies in unison, and means for progressing the cover from one die to another.

2. In a machine of the character set forth, means for partially and inwardly curling the dependent surrounding edge of a cover, means for introducing a wire inside of the said edge, and means for completing the inward curling of the edge of the blank over the wire.

3. In a machine of the character set forth, means for cutting two openings in the dependent surrounding edge of a cover, means for introducing a wire inside of the said edge, a part of said wire projecting out through one of the two openings, and means for curling the edge of the cover over the wire.

4. In a machine of the character set forth, means for cutting two openings in the dependent surrounding edge of a cover, means for introducing a wire inside of the said edge, a part of said wire projecting out though one of the two openings, means for curling the edge of the cover over the wire, and means for bending the projecting part of the wire up against the outside of the dependent surrounding edge of the cover.

5. In a machine of the character set forth, means for partially curling the dependent surrounding edge of a cover, means for cutting two openings in the dependent surrounding edge of the said cover, means for introducing a wire inside of the said edge, a part of said wire projecting out through one of the two openings, and means for curling the edge of the said cover over the wire.

6. In a machine of the character set forth, means for partially curling the dependent surrounding edge of a cover, means for cutting two openings in the dependent surrounding edge of the said cover, means for introducing a wire inside of the said edge, a part of said wire projecting out through one of the two openings, means for curling the edge of the said cover over the wire, and means for bending the projecting part of the wire up against the outside of the dependent surrounding edge of the cover.

7. In a machine of the character set forth, a die for partially curling the dependent surrounding edge of a cover, a die for cutting two openings in the said edge, a die for introducing a wire inside of the said edge leaving an excess of wire projecting outside the cover and for curling the said edge over the wire, a die for bending the said excess of wire up against the outside of the cover, and a conveyer mechanism for progressing the cover from one die to another.

8. In a machine of the character set forth, the combination of a plurality of dies, a knockout pad in each die, a conveying mechanism located above the dies for progressing blanks through the machine and having a reciprocating motion, means for moving the pads down and out of the way of the conveying mechanism when it moves in one direction, and means for moving the conveying mechanism out of the way of the pads when it moves back in the opposite direction.

9. In a machine of the character set forth, the combination of a plurality of dies, a constantly-rotating blank-feeding dial, stops located intermediate the dial and the dies, and a conveying mechanism for progressing the blanks through the machine and for operating the stops.

10. In a machine of the character set forth, the combination of a plurality of dies, a constantly-rotating blank-feeding dial, two stops intermediate the dial and the dies, a conveying mechanism for progressing the blanks through the machine having a combined rocking and longitudinal reciprocating motion, and means carried by the conveying mechanism for opening one of said stops on the longitudinal motion in one direction and for opening the other stop on the rocking motion in one direction.

11. In a machine of the character set forth, the combination with a wiring-die, of means for introducing a wire into the said die, means for subsequently moving a cover having a dependent surrounding edge into position on said die, and means for inwardly curling the edge of the cover over the said wire.

12. In a machine of the character set forth, the combination with a wiring-die, of means for introducing an excess of wire into the said die, means for partially retracting the wire out of the die and cutting it off so as to leave an excess outside the die, means for subsequently moving a cover having a dependent surrounding edge into position on the said die, and means for inwardly curling the edge of the cover over the said wire, the excess of wire projecting outside the cover.

13. In a machine of the character set forth, a wiring-die comprising: an intermediate stationary member, an outer vertically-movable member, and an inner expansible member, means for feeding a wire into the said die against the outer vertically-movable member, means for expanding the inner expansible member, and means for retracting the wire.

14. In a machine of the character set forth, a wiring-die comprising an intermediate member having a circumferential depression, an outer member having a circumferential incision, and an inner expansible member having a circumferential flange adapted to extend over the circumferential depression when in its expanded position.

15. In a machine of the character set forth, the combination with a wiring-die comprising an intermediate member having a circumferential depression, an outer member having a circumferential incision and an inner expansible member having a circumferential flange adapted to extend over the circumferential depression when in its expanded position, of means for feeding a wire into the said die against the incision of the outer member, means for expanding the inner expansible member, so that the latter extends over the circumferential depression of the intermediate member, and means for retracting the wire so as to tighten it into the said circumferential depression.

16. In a machine of the character set forth, the combination with a wiring-die comprising an intermediate member having a circumferential depression, an outer member having a circumferential incision and an inner expansible member having a circumferential flange adapted to extend over the circumferential depression when in its expanded position, of means for feeding a wire into the said die against the incision of the outer member, means for expanding the inner expansible member, so that the latter extends over the circumferential depression of the intermediate member, and means for retracting the wire so as to tighten it into the said circumferential depression, means for subsequently moving a cover having a dependent surrounding edge into position on the die, and means for inwardly curling the said edge over the wire.

17. In a machine of the character set forth, the combination with a wiring-die comprising an intermediate member having a circumferential depression, an outer member having a circumferential incision and an inner expansible member having a circumferential flange adapted to extend over the circumferential depression when in its expanded position, of means for feeding a wire into the said die against the incision of the outer member, means for expanding the inner expansible member, so that the latter extends over the circumferential depression of the intermediate member, means for pinching the wire, and means for retracting the wire so as to tighten it into the circumferential depression.

18. In a machine of the character set forth, the combination with a wiring-die comprising an intermediate member having a circumferential depression, an outer member having a circumferential incision and an inner expansible member having a circumferential flange adapted to extend over the circumferential depression when in its expanded position, of means for feeding a wire into the said die against the incision of the outer member, means for expanding the inner expansible member, so that the latter extends over the circumferential depression of the intermediate member, means for pinching the wire, means for retracting the wire so as to tighten it into the circumferential depression, means for subsequently moving a cover having a dependent surrounding edge into position on the die, and means for inwardly curling the said edge over the wire.

19. In a machine of the character set forth, a wiring-die comprising: an intermediate stationary member, an outer member, and an inner expansible member, means for feeding a wire into the said die against the outer member, means for expanding the inner expansible member, and means for retracting the wire.

20. In a machine of the character set forth, a wiring-die comprising an intermediate stationary member having a circumferential depression, an outer vertically-movable member having an inside peripheral surface and a circumferential ledge, the latter being substantially coincident with, but not projecting over, the circumferential depression of the stationary member, and an inner expansible member having a circumferential flange adapted to extend over the circumferential depression when in its expanded position.

21. In a machine of the character set forth, the combination with a wiring-die, comprising an intermediate member having a circumferential depression, an outer vertically-movable member having an inside peripheral surface, and a circumferential ledge, the latter being substantially coincident with, but not projecting over, the circumferential depression of the stationary member, and an inner expansible member, of means for feeding a wire into the said die against the inside peripheral surface, means for expanding the inner expansible member so that the latter extends over the circumferential depression of the stationary member, and means for retracting the wire so as to tighten it around the inner expansible member and into the circumferential depression of the intermediate member.

22. In a machine of the character set forth, the combination with a wiring-die, comprising an intermediate member having a circumferential depression, an outer vertically-movable member having an inside peripheral surface and a circumferential ledge, the latter being substantially coincident with, but not projecting over, the circumferential depression of the stationary member, and an inner expansible member, of means for feeding a wire into the said die against the inside peripheral surface, means for expanding the inner expansible member so that the latter extends over the circumferential depression of the stationary member, means for retracting the wire so as to tighten it around the inner expansible member and into the circumferential depression of the intermediate member, means for subsequently moving a cover having a dependent surrounding edge into position on the die, and means for inwardly curling the said edge over the wire.

23. In a machine of the character set forth, the combination with a wiring-die, comprising an intermediate member having a circumferential depression, an outer vertically-movable member having an inside peripheral surface and a circumferential ledge, the latter being substantially coincident with, but not projecting over, the circumferential depression of the stationary member, and an inner expansible member, of means for feeding a wire into the said die against the inside peripheral surface, means for expanding the inner expansible member so that the latter extends over the circumferential depression of the stationary member, means for pinching the wire, and means for retracting the wire so as to tighten it around the inner expansible member and into the circumferential depression.

24. In a machine of the character set forth, the combination with a wiring-die, comprising an intermediate member having a circumferential depression, an outer vertically-movable member having an inside peripheral surface and a circumferential ledge, the latter being substantially coincident with, but not projecting over, the circumferential depression of the stationary member, and an inner expansible member, of means for feeding a wire into the said die against the inside peripheral surface, means for expanding the inner expansible member so that the latter extends over the circumferential depression of the stationary member, means for pinching the wire, means for retracting the wire so as to tighten it around the inner expansible member and into the circumferential depression, means for subsequently moving a cover having a dependent surrounding edge into position on the die, and means for inwardly curling the said edge over the wire.

25. In a machine of the character set forth, the combination with a wiring-die, having a plurality of members, of means for introducing an excess of wire into the said die, means for pinching the free end of the wire, and means for retracting the excess of wire out of the die.

26. In a machine of the character set forth, the combination with a wiring-die, having a plurality of members, of means for introducing an excess of wire into the said die, means for pinching the free end of the wire, and means for retracting the excess of wire out of the die and cutting it off so as to leave an excess outside the die, means for subsequently moving a cover having a dependent surrounding edge, into position on the said die, and means for inwardly curling the cover over the said wire, the excess of wire projecting outside the cover.

27. In a machine of the character set forth, the combination with a wiring-die, of a movable plate located adjacent thereto, a cutter mechanism for cutting off and bending the wire, a finger for pinching the wire, and a second finger for moving the wire in toward the center of the die, all carried by the plate.

28. In a machine of the character set forth, the combination with a wiring-die, of a movable plate located adjacent thereto, a cutter mechanism for cutting off and bending the wire, a finger for pinching the wire, and a second finger for moving the wire in toward the center of the die, all carried by the plate, means for moving the plate toward the die by two movements having an interval between them, and for moving the plate away from the die by a single movement.

29. In a machine of the character set forth, the combination with two dies, adapted to act successively on a blank, of a wire-feed mechanism for feeding wire to one of said dies, and a safety-stop whereby the absence of a blank in the first die during a certain period of the operation prevents the feeding of wire to the second die.

30. In a machine of the character set forth, a die for partially curling the extreme lower dependent surrounding edge of a cover, comprising an outer stationary ring having an annular ledge, a vertically-movable member adapted to hold the upper portion of the dependent edge of the cover rigid against the inside of the stationary ring, and an inner expansible ring having an annular flange for pinching the lower portion of the said edge and for allowing the lowermost portion of same to be partially curled by the annular ledge of the stationary member.

31. In a machine of the character set forth, the combination with a die having a movable member, of two rock-shafts mounted adjacent to same, a cutting device carried by one of said rock-shafts, means for operating the movable member of the die carried by the other rock-shaft, means for rocking said rock-shafts simultaneously thereby operating the cutting device and thereby also imparting a motion in the direction of the cutting device to the movable member.

32. In a machine of the character set forth, the combination with a die, having a movable member, of two parallel rock-shafts located adjacent to same, a cutting device carried by one of said rock-shafts, means for moving the movable member carried by the other rock-shaft, a spring normally holding said rock-shafts so that they will not turn toward each other, and means for turning said rock-shafts toward each other periodically.

33. In a machine of the character set forth, the combination with a die, having a movable member, of two parallel rock-shafts located adjacent to same, a cutting device carried by one of said rock-shafts, means for moving the movable member carried by the other rock-shaft, a spring normally holding said rock-shafts so that they will not turn toward each other, arms and a link connecting said rock-shafts, a contacting surface, and a plunger for descending upon the said surface to simultaneously rock the shafts toward each other.

34. In a machine of the character set forth, the combination of two parallel rock-shafts, a sleeve slidably mounted on each of said shafts, opposed gripping and conveying portions carried by said sleeves, means connecting said shafts, means for rocking said shafts, and means for reciprocating the sleeves on the shafts in unison.

35. In a machine of the character set forth, the combination with two wire-feed rolls, of means for imparting an intermittent motion to the said rolls in one direction only, and a separate retractor mechanism for pulling back the wire only, fed by the rolls, independently of the said rolls.

36. In a machine of the character set forth, the combination with rolls for feeding wire, of a separate retractor mechanism for pulling back the wire only and independently of the rolls.

37. In a machine of the character set forth, the combination of a stationary and a movable roll, means for normally holding the movable roll out of contact with the stationary roll, a slider, a dog carried by same for moving the said movable roll into contact with the stationary roll, when the slider moves in one direction, and means for imparting motion to the rolls.

38. In a machine of the character set forth, the combination of a stationary and a movable roll, means for normally holding the movable roll out of contact with the stationary roll, a slider, a dog carried by same for moving the said movable roll into contact with the stationary roll, when the slider moves in one direction, means for imparting motion to the rolls, and a safety-dog for preventing the movable roll from coming in contact with the stationary one.

39. In a machine of the character set forth, the combination of a stationary and a movable roll, means for normally holding the movable roll out of contact with the stationary roll, a slider, a dog carried by same for moving the said movable roll into contact with the stationary roll, when the slider moves in one direction, means for imparting motion to the rolls, and a retractor-dog carried by the slider to pull back the wire on the return stroke of the said slider.

40. In a machine of the character set forth, the combination of a stationary and a movable roll, means for normally holding the movable roll out of contact with the stationary roll, a slider, a dog carried by same for moving the said movable roll into contact with the stationary roll, when the slider moves in one direction, means for imparting motion to the rolls, a retractor-dog carried by the slider to pull back the wire on the return stroke of the said slider, and a safety-dog for preventing the movable roll from coming in contact with the stationary roll and for preventing the retractor-dog from acting.

41. In a machine of the character set forth, the combination of a wire-feed roll mounted in stationary bearings, a movable wire-feed roll, a toggle-joint for holding the movable roll, an arm controlling said toggle-joint, a spring for normally holding the movable roll out of contact with the stationary roll, and a dog for engaging with the arm to move the said movable roll into contact with the stationary roll.

42. In a machine of the character set forth, the combination of a wire-feed roll mounted in stationary bearings, a movable wire-feed roll, a toggle-joint for holding the movable roll, an arm controlling said toggle-joint, a spring for normally holding the movable roll out of contact with the stationary roll, a slider, a dog carried by said slider to engage with the arm to move the movable roll into contact with the stationary roll, and means for operating the slider.

43. In a machine of the character set forth, the combination of a wire-feed roll mounted in stationary bearings, a movable wire-feed roll, a toggle-joint for holding the movable roll, an arm controlling said toggle-joint, a spring for normally holding the movable roll out of contact with the stationary roll, a slider, a dog carried by said slider to engage with the arm to move the movable roll into contact with the stationary roll, a retractor-dog carried by the slider to pull back the wire on the return stroke of the said slider, means for operating said slider, and a safety-dog for preventing the engagement of the dog carried by the slider with the arm of the toggle-joint and for preventing the operation of the retractor-dog.

44. In a machine of the character set forth, the combination of a wire-feed roll mounted in stationary bearings, a movable wire-feed roll, a toggle-joint for holding the movable roll, an arm controlling said toggle-joint, a spring for normally holding the movable roll out of contact with the stationary roll, a slider, a dog carried by said slider to engage with the arm to move the movable roll into contact with the stationary roll, means for operating the slider, and a safety-dog for preventing the engagement of the dog carried by the slider with the arm of the toggle-joint.

45. In a machine of the character set forth, the combination with a wire-feed mechanism, of a safety-dog for rendering said wire-feed mechanism inactive, a rock-shaft carrying said safety-dog, a rod having a nut carried by said rock-shaft, a spring on said rod compressible against the said nut, a sliding sleeve on said rod to compress the spring and rock the rock-shaft, a cam and connections for sliding said sleeve on the rod, and means whereby the rocking of the rock-shaft will normally be prevented.

46. In a machine of the character set forth, the combination of a wiring-die, a die located in advance of the wiring-die, a wire-feed mechanism, a safety-dog for rendering said wire-feed mechanism inactive, a rock-shaft carrying said safety-dog, a rod having a nut carried by said rock-shaft, a spring on said rod compressible against the said nut, a sliding sleeve on said rod to compress the spring and rock the rock-shaft, a cam and connections for sliding said sleeve on the rod, a pivoted lever having a projection for extending into the die located in advance of the wiring-die, and a connection from said pivoted lever to the rock-shaft carrying the safety-dog and the rod.

47. In a machine of the character set forth, the combination with a wire-feed mechanism and a retractor mechanism, of a safety-dog for rendering said wire-feed mechanism and said retractor mechanism inactive, a rock-shaft carrying said safety-dog, a rod having a nut carried by said rock-shaft, a spring on said rod compressible against the said nut, a sliding sleeve on said rod to compress the spring and rock the rock-shaft, a cam and connections for sliding said sleeve on the rod, and means whereby the rocking of the rock-shaft will normally be prevented.

48. In a machine of the character set forth, the combination of a wiring-die, a die located in advance of the wiring-die, a wire-feed mechanism and a retractor mechanism, a safety-dog for rendering said wire-feed mechanism and said retractor mechanism inactive, a rock-shaft carrying said safety-dog, a rod having a nut carried by said rock-shaft, a spring on said rod compressible against the said nut, a sliding sleeve on said rod to compress the spring and rock the rock-shaft, a cam and connections for sliding said sleeve on the rod, a pivoted lever having a projection for extending into the die located in advance of the wiring-die, and a connection from said pivoted lever to the rock-shaft carrying the safety-dog and the rod.

49. In a machine of the character set forth, a die for partially and inwardly curling the extreme lower dependent surrounding edge of a cover, comprising an outer stationary ring having an annular ledge, a vertically-movable member adapted to hold the upper portion of the dependent edge of the cover rigid against the inside of the stationary ring, and an inner expansible ring having an annular flange for pinching the lower portion of the said edge and for allowing the lowermost portion of same to be partially and inwardly curled by the annular ledge of the stationary member.

50. In a machine of the character set forth, the combination of two parallel rock-shafts, a sleeve slidably mounted on each of said shafts, opposed gripping and conveying portions located in the same horizontal plane carried by said sleeves, means connecting said shafts, means for rocking said shafts, and means for reciprocating the sleeves on the shafts in unison.

Signed at New York, borough of Brooklyn, this 15th day of October, 1902.

HERBERT H. HULL.

Witnesses:
    AXEL V. BEEKEN,
    F. D. MACKAY.